UNITED STATES PATENT OFFICE.

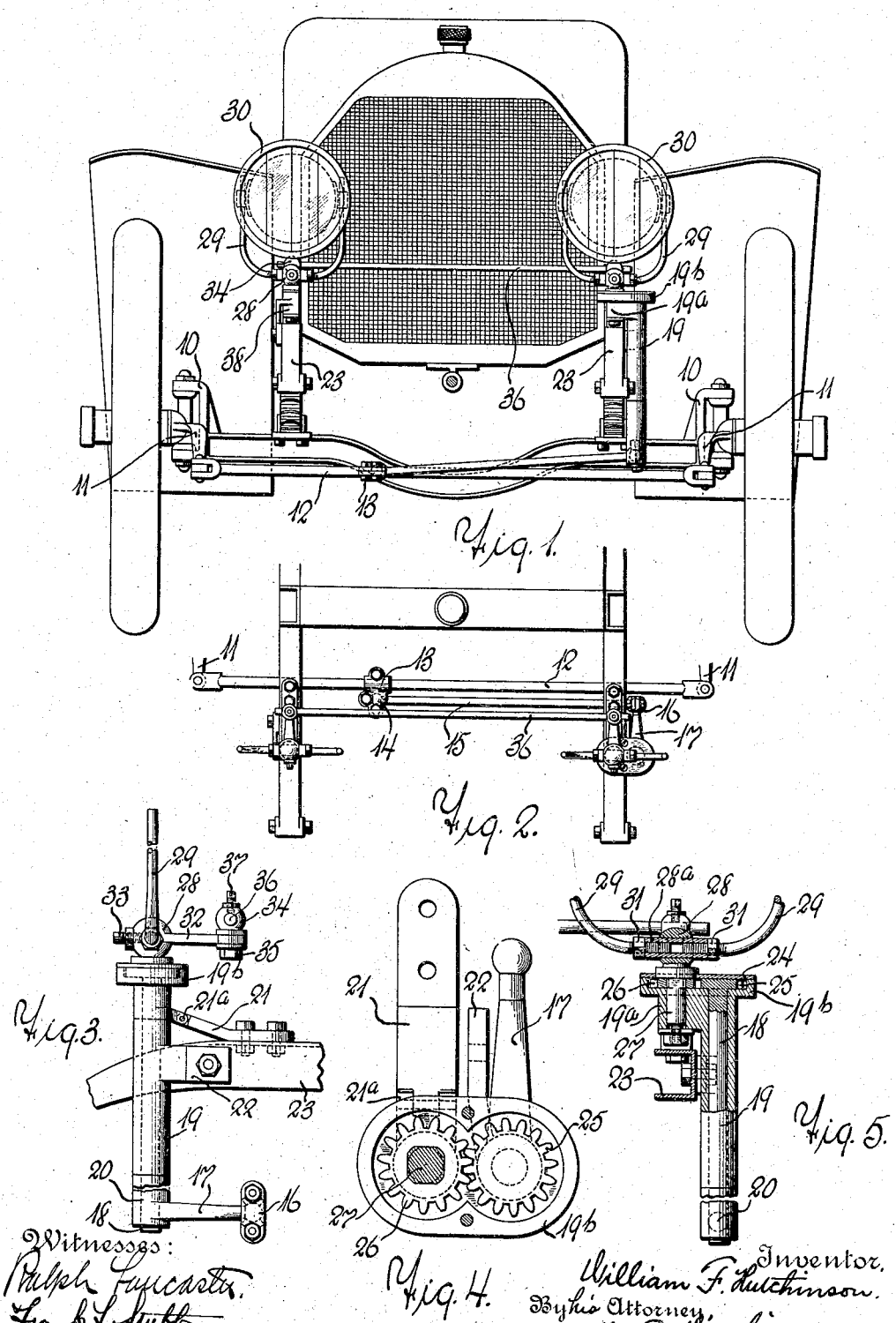

WILLIAM F. HUTCHINSON, OF NYACK, NEW YORK, ASSIGNOR OF ONE-HALF TO CHARLES A. TATUM, OF NEW YORK, N. Y.

LAMP-WORKING APPARATUS.

No. 930,670.   Specification of Letters Patent.   Patented Aug. 10, 1909.

Application filed November 14, 1908. Serial No. 462,553.

*To all whom it may concern:*

Be it known that I, WILLIAM F. HUTCHINSON, of Nyack, Rockland county, New York, have invented a new and useful Improvement in Lamp-Working Apparatus, of which the following is a full, clear, and exact description.

My invention relates to improvements in mechanism for operating, that is, directing lamps on automobiles and other vehicles.

The object of my invention is to produce an extremely simple and positive mechanism actuated by the turning of the wheels in steering, and adapted to automatically turn the lamps, or at least one lamp, so that the light rays will precede the wheels instead of projecting off at an angle when a turn is made.

I am aware that mechanism is used for accomplishing the above result, but this invention is intended to reduce said mechanism to very simple and positive terms, and to provide an apparatus which readily adjusts itself to any inequality of the road and which is not likely to get out of order or be badly fouled with dust, etc.

My invention is also intended to produce an apparatus which can be very conveniently attached to the frame of any ordinary car.

Reference is to be had to the accompanying drawings forming a part of this specification, in which similar reference characters indicate corresponding parts in all the views.

Figure 1 is a front elevation of an automobile provided with my improved apparatus. Fig. 2 is a detail plan of a portion of the apparatus. Fig. 3 is an enlarged detail in side elevation, showing especially, the means of attaching the device to the automobile or car frame. Fig. 4 is a detail sectional plan of the gear case and its accessories, and Fig. 5 is a broken detail partly in vertical section, showing the direct means for turning the lamp.

The automobile or other car can be of any approved kind, and I have shown it provided with the customary steering knuckles 10 having forwardly extending arms 11, which, however, in some cars extend rearward instead of forward. The arms are connected by the connecting rod 12 as usual, and on this is coupled a clip 13 having a ball joint 14 attached which, however, because it is not new in detail, is not therefore shown in detail. A pitman 15 connects with the ball joint and also with a second ball joint 16 on the crank arm 17, and the latter extends forward horizontally and is secured to the vertical shaft 18 which turns in a journal bearing 19, and has a collar 20 connecting it dust tight with the bearing. The bearing 19 is in the form of a sleeve and has an offset 19$^a$ forming a bearing for a stud 27 which will be hereinafter referred to. The bearing or sleeve 19 is provided with brackets 21 and 22 by means of which it is attached to the side frame 23 of the car. The bracket 21 is jointed as shown at 21$^a$ so that after the bolt is put through the bracket 22, the bracket 21 can be adjusted to bring the sleeve 19 to the right position. The shaft 18 extends upward and has at the top a gear 25 which turns in a gear case 19$^b$ formed on the upper end of the sleeve or journal bearing 19. The gear 25 meshes with a corresponding gear 26 on the vertical stud or pin 27, and the latter has an enlarged head 28 which extends upward through the top of the gear case 19$^b$. The head of the pin 28 carries an internally screw threaded sleeve 28$^a$ (see Fig. 5) into which are screwed the arms 29 of the lamp bracket which supports the lamp 30. Nuts 31 on the arms serve to lock them in place, and by manipulating the nuts and turning the arms, they can be adjusted so as to fit different widths of lamps. The arms can be tipped with the sleeve 28$^a$ and held in position by the set screw 33.

The stud head 28 has a rearwardly extending crank 32, and the crank carries a stud 34 which is secured by means of a nut 35 and a connecting rod 36 extends through the stud 34 and is secured by the set screw 37 or equivalent fastening. The connecting rod 36 connects with the second stud 34 on the opposite side of the frame of the machine, and this stud 34 is carried by a crank 32 connecting with a stud 28 like that already described, and this second stud 28 is journaled in a bracket 38 and carries a second lamp 30 precisely as in the first instance described. Thus the two lamps are operated in unison, but by disconnecting the rod 36 one lamp can be held stationary and the other turned by the steering of the wheel.

It will be observed that when the wheels are turned as in steering, a lateral movement will be imparted to the rod 12 and pitman 15, and that the movement will also, by means of the crank 17, shaft 18 and gears 25 and 26, be imparted to the stud 27 and to the lamp bracket 29. It will be further observed that there is very little mechanism in this apparatus, and that the parts are connected so as to be positive in their movements, easily accessible, and little likely to get out of order.

Having thus fully described my invention, I claim as new and desire to secure by Letters Patent:—

1. The combination with a wheeled vehicle having steering mechanism, of vertically arranged oscillating studs supported on the frame of the vehicle and connected together to turn in unison, a gear case supported on the vehicle frame, a gear in the case connected to one of the aforesaid studs, and a second gear meshing with the first gear and operatively connected with the steering mechanism.

2. The combination with a wheeled vehicle having steering mechanism, of a sleeve supported thereon, said sleeve merging at its upper end into an inclosed gear case, a shaft in the sleeve, a crank and pitman connection between the shaft and a part of the steering mechanism, a stud projecting upward from the gear case, said stud being geared to the aforesaid shaft, and a lamp bracket carried by the stud.

WILLIAM F. HUTCHINSON.

Witnesses:
WARREN B. HUTCHINSON,
M. G. O'DONNELL.